(12) United States Patent  (10) Patent No.: US 7,606,576 B2
Chen et al.  (45) Date of Patent: Oct. 20, 2009

(54) DISTRIBUTED MICRO INSTRUCTION SET PROCESSOR ARCHITECTURE FOR HIGH-EFFICIENCY SIGNAL PROCESSING

(75) Inventors: Song Chen, San Jose, CA (US); Paul L. Chou, Santa Clara, CA (US); Christopher C. Woodthorpe, Los Gatos, CA (US); Venugopal Balasubramonian, Campbell, CA (US); Keith Rieken, Cupertino, CA (US)

(73) Assignee: Infineon Technologies AG, Neubiberg (DE)

( * ) Notice: Subject to any disclaimer, the term of this patent is extended or adjusted under 35 U.S.C. 154(b) by 1837 days.

(21) Appl. No.: 09/912,721

(22) Filed: Jul. 24, 2001

(65) Prior Publication Data

US 2002/0065116 A1  May 30, 2002

Related U.S. Application Data

(60) Provisional application No. 60/220,295, filed on Jul. 24, 2000.

(51) Int. Cl.
*H04Q 7/20* (2006.01)
(52) U.S. Cl. .................. 455/453; 455/423; 455/560; 455/446
(58) Field of Classification Search ............. 455/560, 455/445, 453, 434, 561, 424, 514, 507, 510, 455/515, 450, 452.1, 423, 446, 418, 420, 455/67.11, 509; 370/465, 466, 335, 336; 719/310; 712/30, 34; 375/142, 144
See application file for complete search history.

(56) References Cited

U.S. PATENT DOCUMENTS 5,842,014 A * 11/1998 Brooks et al. .............. 718/103
5,925,114 A    7/1999 Hoang
6,161,170 A * 12/2000 Burger et al. .............. 712/30
6,192,250 B1 * 2/2001 Buskens et al. ............ 455/463

(Continued)

FOREIGN PATENT DOCUMENTS

EP    0 427 558 A2   5/1991

OTHER PUBLICATIONS

Holma et al. (edited by), 2000, "*WCDMA For UMTS Radio Access for Third Generation Mobile Communications*," John Wiley & Sons, LTD,: vi-322.

(Continued)

*Primary Examiner*—John J Lee
(74) *Attorney, Agent, or Firm*—Dickstein Shapiro LLP

(57) ABSTRACT

A wireless communication system hosts a plurality of processes in accordance with a communication protocol. The system includes application specific instruction set processors (ASISPs) that provided computation support for the process. Each ASISP is capable of executing a subset of the functions of a communication protocol. A scheduler is used to schedule the ASISPs in a time-sliced algorithm so that each ASISP supports several processes. In this architecture, the ASISP actively performs computations for one of the supported processes (active process) at any given time. The state information of each process supported by a particular ASISP is stored in a memory bank that is uniquely associated with the ASISP. When a scheduler instructs an ASISP to change which process is the active process, the state information for the inactivated process is stored in the memory bank and the state information for the newly activated process is retrieved from the memory bank.

46 Claims, 9 Drawing Sheets

U.S. PATENT DOCUMENTS

| | | | |
|---|---|---|---|
| 6,223,274 | B1* | 4/2001 | Catthoor et al. ............... 712/34 |
| 6,405,309 | B1* | 6/2002 | Cheng et al. .................... 713/1 |
| 6,421,429 | B1* | 7/2002 | Merritt et al. ............ 379/93.17 |
| 6,741,608 | B1* | 5/2004 | Bouis et al. ................. 370/465 |
| 6,751,478 | B1* | 6/2004 | Sakai et al. ................. 455/560 |
| 7,032,223 | B2* | 4/2006 | Liu ............................. 719/310 |
| 7,062,769 | B1* | 6/2006 | Ma et al. .................... 719/312 |
| 2001/0042139 | A1* | 11/2001 | Jeffords et al. .............. 709/316 |

OTHER PUBLICATIONS

U.S. Appl. No. 09/828,381, "*Virtual Machine Interface for Hardware Reconfigurable and Software Programmable Processors*," filed Apr. 5, 2001, Chen et al.

U.S. Appl No. 09/751,777, "*A Fast Initial Acquisition and Search Device for a Spread Spectrum Communication System*," filed Dec. 29, 2000, Medlock et al.

U.S. Appl. No. 09/751,785, "*A Configurable Multimode Despreader for Spread Spectrum Applications*," filed Dec. 29, 2000, Subramanian.

U.S. Appl. No. 09/751,783, "*Configurable All-Digital Coherent Demodulator System for Spread Spectrum Applications*," filed Dec. 29, 2000, Subramanian.

U.S. Appl. No. 09/751,776, "*Apparatus and Method for Calculating and Implementing a Fibonacci Mask for a Code Generator*," filed Dec. 29, 2000, Medlock.

U.S. Appl. No. 09/751,782, "*A Configurable Code Generator System for Spread Spectrum Applications*," filed Dec. 29, 2000, Medlock et al.

U.S. Appl. No. 60/222,829, "*Universal Code Generation*," filed Aug. 3, 2000, Medlock.

U.S. Appl. No. 09/772,584, "*Wireless Spread Spectrum Communication Platform Using Dynamically Reconfigurable Logic*," filed Jan. 29, 2001, Subramanian et al.

Gatherer et al., "DSP-Based Architectures for Mobile Communications: Past, Present and Future", IEEE Communications Magazine, IEEE USA, vol. 38, No. 1, pp. 84-90 (Jan. 2000).

Paulin et al., "Embedded Software in Real-Time Signal Processing Systems: Application and Architecture Trends", Proceedings of the IEEE, IEEE USA, vol. 85, No. 3, pp. 419-435 (Mar. 1997).

* cited by examiner

DISTRIBUTED MICRO INSTRUCTION SET PROCESSOR ARCHITECTURE FOR HIGH-EFFICIENCY SIGNAL PROCESSING

This application claims priority to the U.S. Provisional Patent Application DISTRIBUTED MICRO INSTRUCTION SET PROCESSOR ARCHITECTURE FOR HIGH-EFFICIENCY SIGNAL PROCESSING, Ser. No. 60/220,295, that was filed Jul. 24, 2000.

CROSS-REFERENCE TO RELATED APPLICATIONS

Related applications incorporated herein by reference are as follows:

A CONFIGURABLE CODE GENERATOR SYSTEM FOR SPREAD SPECTRUM APPLICATIONS, U.S. patent application No. 09/751,782, filed Dec. 29, 2000.

APPARATUS AND METHOD FOR CALCULATING AND IMPLEMENTING A FIBRONACCI MASK FOR A CODE GENERATOR, U.S. patent application No. 09/751,776, filed Dec. 29, 2000.

A FAST INITIAL ACQUISITION AND SEARCH DEVICE FOR A SPREAD SPECTRUM COMMUNICATION SYSTEM, U.S. patent application No. 09/751,777, filed Dec. 29, 2000.

A CONFIGURABLE ALL-DIGITAL COHERENT DEMODULATOR SYSTEM FOR SPREAD SPECTRUM APPLICATIONS, U.S. patent application No. 09/751,783, filed Dec. 29, 2000.

A CONFIGURABLE MULTIMODE DESPREADER FOR SPREAD SPECTRUM APPLICATIONS, U.S. patent application No. 09/751,785, filed Dec. 29, 2000.

A WIRELESS SPREAD SPECTRUM COMMUNICATION PLATFORM USING DYNAMICALLY RECONFIGURABLE LOGIC, U.S. patent application No. 09/772,584, filed Jan. 29, 2001.

VIRTUAL MACHINE INTERFACE AND APPLICATION PROGRAMMING INTERFACE FOR HARDWARE RECONFIGURABLE AND SOFTWARE PROGRAMMABLE PROCESSOR, U.S. patent application No. 09/828,381, filed Apr. 5, 2001.

UNIVERSAL CODE GENERATION, Ser. No. 60/222,829, filed Aug. 3, 2000.

BRIEF DESCRIPTION OF THE INVENTION

This invention relates generally to wireless communication systems that use distributed application specific instruction set processors (ASISPs) to support one or more processes hosted by the wireless communication system.

BACKGROUND OF THE INVENTION

A wireless communication system is typically a digital wireless communication network in which geographical areas are divided into a number of smaller areas or cells in order to provide scalability of coverage for multiple users with minimal intercell interference. A mobile wireless communication system is typically a network in which terminal devices, such as users or mobiles, are in motion relative to a basestation.

In a typical digital wireless communication network, multiple basestations are provided to perform switching and connection services between users or terminal devices. FIG. 1 illustrates typical wireless communication system architecture. Basestation 105-1 provides wireless communication system to mobile stations 101 and 103. Similarly, basestation 105-2 provides wireless communication system to mobile stations 111 and 113. Basestation 105-1 is connected to the basestation 105-2 via network 107.

Referring to FIG. 1, a basestation 105 (BS) provides basic connection service to terminal devices 101, by terminating the radio path and connecting the terminal devices to network 107. A mobile station (MS) 101 terminates the radio path on the user side and enables the user to gain access to services from the network. Network 107 typically comprises a mobile switching center (MSC). The MSC is an automatic system that interfaces the user traffic from the wireless network with the wireline network or other wireless networks. The basestations 105 exchange messages with the MSC.

A variety of communication protocols can be used to operate and control a wireless communication system such as the system shown in FIG. 1. Representative communication protocols include, but are not limited to, the TDMA (time division multiple access) and CDMA (code division multiple access) protocol families. Among other adoptions, the TDMA protocol is used by GSM (Global System for Mobile Communication) which comprises GPRS (General Packet Radio Service), ECSD (Enhanced Circuit Switched Data), and EDGE (Enhanced Data rates for Global Evolution) systems. The CDMA protocol is adopted by cdma2000, wideband CDMA (WCDMA), IS-95 CDMA, IS-95B CDMA, CDMA TIA IS2000, TIA IS 2000A, WIMS W-CDMA, ARIB WCDMA, 1Xtrem, 3GPP-FDD, 3GPP-TDD, TD/SCDMA, as well as several other multi-carrier CDMA systems. Additional 2G and/or 3G CDMA protocols may be found in WDCDMA for UMTS, Hohna and Toskala eds., John Wiley & Sons. Inc., New York, (2000); as well as IS-95 CDMA and cdma2000, Garg ed., Prentice Hall PTR, Upper Saddle River, N.J., (2000).

Although TDMA and CDMA are the most common communication protocols used by wireless communication systems, they each have unique system requirements. For example, systems using TDMA require maximum likelihood sequence estimation (MLSE) equalization whereas systems using CDMA do not. In contrast, systems using CDMA require RAKE receivers whereas systems using TDMA do not. Even within the same protocol family, there are variations in the hardware necessary to support a communication protocol. For example, although both the global positioning system (GPS) and IS-95 are CDMA protocols, GPS and IS-95 have distinctly different hardware requirements. For example, an IS-95 system requires a convolutional decoder whereas GPS does not.

Communication protocols used in wireless communication systems include several computationally expensive functions. Therefore, significant computational resources are required regardless of which communication protocol is used in a wireless communication system. These computationally expensive functions include timing adjustment estimating for delay lock loop and channel estimation processing as well as frequency error estimation, finger energy estimation, and signal-to-interference (SIR) estimation. With the advent of 3G protocols such as CDMA, the computational demands on wireless communication systems have increased. Typical 3G base stations must handle greater capacities, process higher data rates, and support multimedia standards, while at the same time reducing size, cost and power consumption. Adding to the demands on the wireless communication systems is the fact that such systems host anywhere from tens to thousands of processes at any given time. Each process is a mobile, i.e. cellular phone call, or an echo associated with a mobile. At any given instance, a communication protocol requires that several computationally expensive functions be performed to effectively track each echo associated with each mobile hosted by the wireless communication system.

Prior art wireless communication systems use general purpose digital signal processors (DSPs), such as the TMS320C6203 or TMS320C6416 DSP (Texas Instruments, Dallas, Tex.), to execute the computationally expensive functions of a communication protocol. While prior art DSPs are functional and have considerable computational ability, they are somewhat unsatisfactory. In particular, prior art DSPs take an unsatisfactory amount of time to switch from one process to another process. In a basestation, efficient process switching is desirable because it allows a single DSP to support multiple echoes and/or mobiles. Typically, in order to perform a process switch in prior art systems, an expensive hardware interrupt is generated. In response to the hardware interrupt, the state information for the new process is accessed from a remote memory register via a large bus and this state information is loaded into the prior art DSP over the course of several chip cycles. Because this prior art process switch takes a considerable number of chip cycles, it is unsatisfactorily slow. Consequently, large numbers of conventional DSPs are needed in prior art base stations 105 to provide adequate computational support. The use of large numbers of conventional DSPs, which are not optimized for a given application, drive up the cost of making such base stations and it reduces their energy efficiency. Thus, prior art base stations have an unsatisfactory energy consumption profile.

Another problem with known communication architectures arises when support for high channel densities, or related computationally expensive tasks, is required. To provide computational resources for such demanding applications, a large number of DSPs are used in known communication architectures. However, the addition of DSPs in known architectures increases the amount of overhead to each DSP. Thus, known architectures have a nonlinear problem, in which the incremental addition of a DSP, in order to increase computational resources, does not provide a linear incremental increase in the amount of overhead on each DSP. The failure to achieve a linear relationship between the number of DSPs in an architecture and the processing power of the architecture arises because each DSP must coordinate with every other DSP in the architecture. Taken to theoretical limits, the incremental addition of DSPs will provide very little additional computational improvement in known architectures. Thus, known architectures are not optimal because of the high degree of overhead that is incurred when multiple DSPs are used.

Yet another problem with known architectures is that the signal datapath is only loosely coupled in the architecture through an inefficient interrupt mechanism. Thus, each component within the datapath of prior art architectures needs to coordinate with other components in the datapath using inefficient interrupts. The use of such interrupts is yet another source of inefficiency in known architectures.

In view of the foregoing, it is highly desirable to provide systems and methods that provide flexible computational support to wireless communication systems. In particular, it is desirable to provide improved computational devices that may be switched from actively supporting one process to actively supporting another process in a more efficient manner so that the computational device may be effectively used to support multiple processes.

SUMMARY OF THE INVENTION

The present invention provides a system and method for providing flexible computational support to a wireless communication system. In the system and method, programmable computational support is provided by application specific instruction set processors (ASISPs). Each ASISP is capable of executing a subset of the functions of a communication protocol. A scheduler is used to schedule the ASISPs in a time-sliced algorithm so that each process hosted by the wireless communication system is supported. A memory bank is associated with each ASISP. The state information of each process supported by a particular ASISP is stored in the memory bank associated with the particular ASISP. When the scheduler instructs an ASISP to actively support a different process, the memory state of the inactive process is stored in the memory bank associated with the ASISP. Furthermore, the memory state of the newly activated process is retrieved from the memory bank, if such state information is available for the newly activated process. In this way, the system and method of the present invention provides efficient process switching.

The present invention has additional advantages over the prior art. A high level of control is achieved over the ASISP through the use of a novel instruction set that includes a WAIT command. After a given ASISP executes a WAIT command, the ASISP enters a sleep state allowing the external control to efficiently synchronize its processing with the other processing elements in the system. The use of a novel WAIT command in the present invention results in a reduction in the power consumption by the ASISP while the "wait" command is in effect. Some ASISPs of the present invention support specialized instruction set operations designed to efficiently process the applications supported by such ASISPs. For example, one such instruction is a vector multiply operation on a signed vector. This instruction identifies 16 words of signed data and a 16 bit constant that is used to perform signed multiply and accumulation. The matrix used in this instruction is commonly used for operations such as Hadamard and Reed-Mueller coding. One aspect of the present invention provides a wireless communication system for hosting a plurality of processes. Each process in the plurality of processes is executed in accordance with a communication protocol that includes a set of functions. In this embodiment, the wireless communication system includes a plurality of application specific instruction set processors (ASISPs). Each ASISP is capable of executing a subset of the set of functions defined by the communication protocol. Furthermore, the wireless communication system includes a scheduler for scheduling the plurality of ASISPs in accordance with a time-slicing algorithm. As a result, each process hosted by the wireless communication system is supported. This scheduler may be implemented as software, hardware logic, or any combination of software and hardware logic.

In a particular embodiment of the present invention, each ASISP in the wireless communication system includes an input register and an output register. The input register receives an input program and prior state of the process. The input program is associated with a particular process hosted by the wireless communication system. Each instruction in the input program is chosen from a limited purpose instruction set. The limited purpose instruction set supports functions included in the communication protocol. The output register places a value that indicates the state of the process associated with the input program and state after the input program has finished executing on the ASISP.

In one aspect of the present invention, the wireless communication system further includes a plurality of memory modules. Each memory module uniquely corresponds to a different ASISP. Furthermore, the state of the process placed in the ASISP output register is stored in a unique segment of the memory module corresponding to ASISP. The identity of the unique segment of the memory module where this state information is stored is determined by an identity of the process. In one embodiment, the output register is also used to indicate a process identifier value that identifies the process associated with the input program. In this embodiment, the process identifier is used to identify the unique segment of the memory module where the state information is stored.

The communication protocol used by wireless communication systems of the instant invention may be a code division multiple access (CDMA) protocol or a time division multiple access (TDMA) protocol. Representative CDMA protocols include, but are not limited to, IS-95 CDMA, IS-95B CDMA, CDMA TIA IS2000, TIA IS 2000A, wideband CDMA (WCDMA), cdma2000, and ARIB WCDMA. An illustrative TDMA protocol is IS-136 TDMA.

In one embodiment of the present invention, the ASISP is a finger ASISP and the subset of functions supported by the finger ASISP comprise a delay lock loop (DLL) function and a channel estimation function. In another embodiment of the present invention, the ASISP is a combiner ASISP and the subset of functions supported by the combiner ASISP includes a frequency error estimation function, a finger energy estimation function, and a signal-to-interference (SIR) estimation function.

In the present invention, each process supported by an ASISP could be an echo associated with a mobile. In the case of some ASISPs of the present invention, each process supported by an ASISP could be a plurality of echoes associated with a particular mobile. Furthermore, in one embodiment of the present invention, each ASISP is capable of executing a subset of the functions defined by a communication protocol on a time-scale of about 400 to about 5,000 times per second.

Another aspect of the present invention provides a method for reducing an amount of inter-process overhead between computing components in a device capable of hosting a plurality of communication processes. Each communication process in the plurality of communication processes is supported in accordance with a communication protocol. In the method, a plurality of application specific instruction set processors (ASISPs) are distributed. Each ASISP is capable of executing a subset of a set of functions in accordance with the communication protocol. Further, a centralized controller is provided for sending control commands to each said ASISP in the plurality of ASISPs. The centralized controller schedules the functions calculated by each of the ASISPs in the plurality ASISPs in a master/slave relationship, thereby reducing the amount of inter-process overhead between the computing components in the device.

Yet another aspect of the present invention provides a method for hosting a communication process with a communication architecture in accordance with a communication protocol. In the method a plurality of application specific instruction set processors (ASISPs) are allocated in the architecture to support the communication process. Each ASISP in the plurality of ASISPs is capable of executing a subset of a set of functions defined by the communication protocol. A centralized controller is provided in the architecture for scheduling each of the ASISPs in the plurality of ASISPs in accordance with a scheduling scheme. In one embodiment in accordance with this aspect of the invention, each ASISP in the plurality of ASISPs is dimensioned and configured for receiving scheduling commands and process state information from the centralized controller. This process state information describes a state of the communication process.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
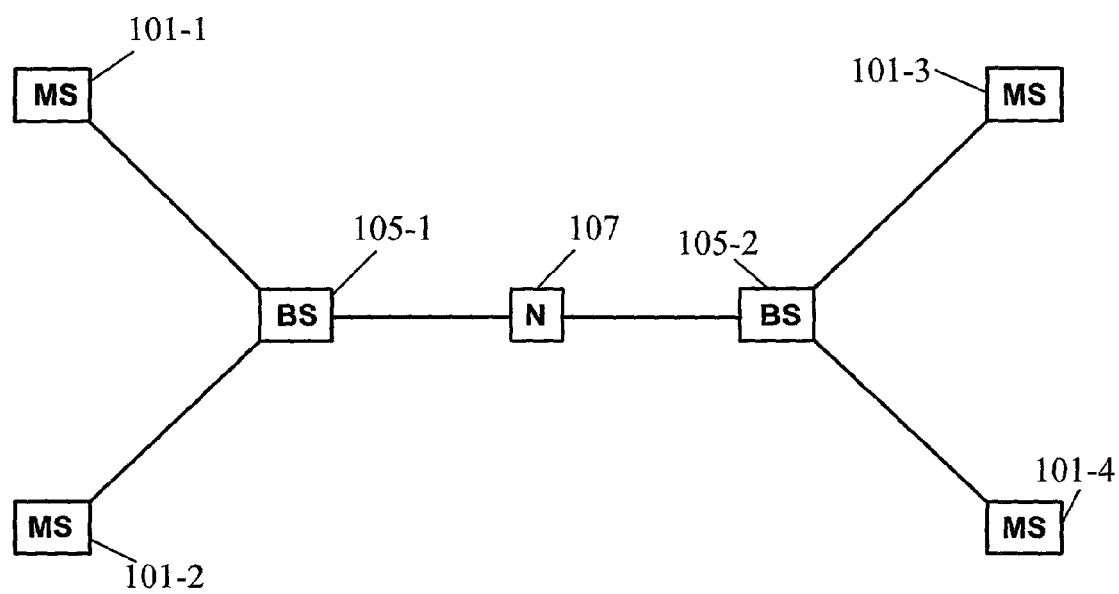
FIG. 1 illustrates a typical wireless communication system architecture.

Reference will now be made in detail to the preferred embodiments of the invention, examples of which are illustrated in the accompanying drawings. While the invention will be described in conjunction with preferred embodiments, it is understood that the description is not intended to limit the invention to these embodiments. Rather, the invention is intended to cover alternatives, modifications and equivalents, which may be included within the spirit and scope of the invention, as defined by the appended claims. Additionally, in the following detailed description of the present invention, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to obscure important aspects of the present invention. Furthermore, while the present invention may be implemented in a wireless communication system, the methods of the present invention are also well suited for other applications and devices.

The architecture of the present invention provides a significant advance over the prior art by improving known architectures at several different levels. First, a centralized controller is used to control the processing schedule for a distributed set of application specific instruction set processors (ASISPs). In one embodiment, the centralized controller operates in a linked list fashion and can therefore control the parallel execution of several different processes using the distributed set of ASISP. Each ASISP in the distributed set of ASISPs sequentially executes input programs provided by the centralized controller. Each of these input programs distributed by the controller is associated with a particular communication process hosted by the inventive communication architecture. Therefore, when an input program is provided to an ASISP by the controller, state information for the process associated with the input program is provided to the ASISP as well. The use of a centralized controller reduces the amount of overhead in the communication architecture because each ASISP does not have to coordinate with other ASISPs. The centralized controller performs this coordination. Thus, the communication architecture of the present invention improves the non-linear relationship between the number of computing devices in a communication architecture and the computing power of the communication architecture.

A second improvement over known communication architectures is that each ASISP is limited to performing a specific subset of the functions associated with a communication protocol. The advantage of limiting the number of functions that can be performed by a particular class of ASISPs is that the memory requirements and the computational ability of the class of ASISPs is scaled to match the demands of the applications designed to run on the class of ASISPs. Such an advantageous design increases the overall efficiency of the communication architecture. ASISPs with relatively little computational ability and memory resources are dedicated to less demanding functions of the communication processes supported by the communication architecture whereas more complex ASISPs with higher computational ability and memory resources are dedicated to more demanding communication protocol functions.

A third improvement over known communication architectures is the introduction of a number of control schemes designed to implement a master/slave relationship between the centralized controller and the distributed set of ASISPs. One such control scheme is the use of specialized commands such as a "wait" command. When the centralized controller sends a "start" command to an ASISP, the ASISP executes the input program of fixed latency, then executes a wait instruction to reenter the idle process. In this way, it is possible to coordinate the schedule of the distributed set of ASISPs in an energy efficient manner.

A fourth improvement over known communication architectures is that ASISPs of the present invention are capable of tracking some process state information associated with each process in a plurality of communication processes hosted by the communication architecture. This advantageous design provides an additional layer of control over the efficient scheduling of the distributed set of ASISPs. For example, rather then dedicating a set of ASISPs to a particular communication process, irrespective of whether the ASISPs are needed by the particular communication process at a given point in time, the scheduler allocates ASISPs to communication processes on a dynamic basis. Advantageously, when an ASISP is reallocated from a first process to a second process, the ASISP uses the state information for the second process stored in the memory associated with the ASISP. The use of local state information reduces bus load.

Representative wireless network communication apparatuses include, but are not limited to, fixed wireless, unlicensed (FCC) wireless, local area network (LAN), cordless telephony, cellular telephony, personal basestation, and telemetry. Other applications include navigation, encryption, and other digital data processing applications.

Figure 2:
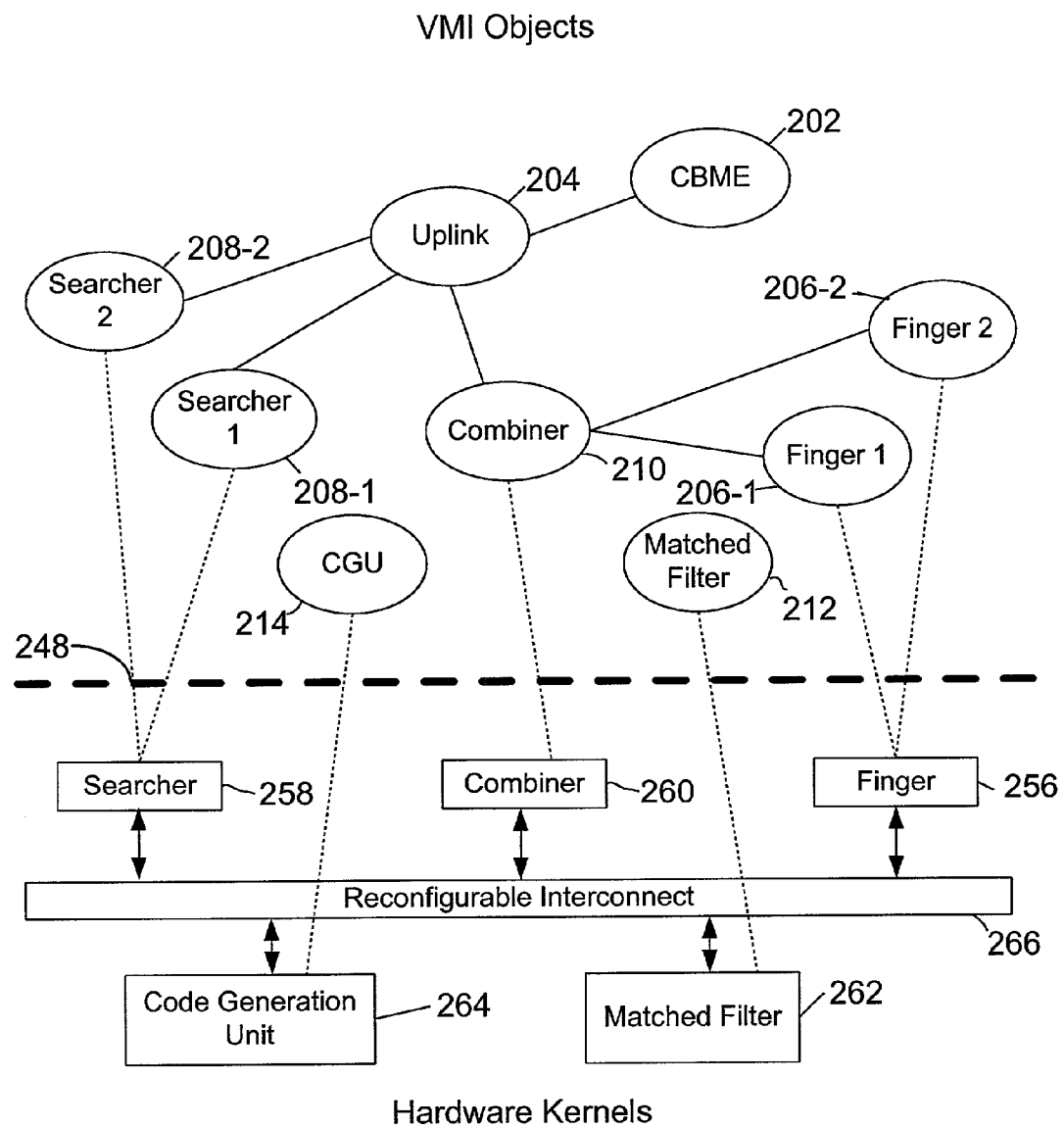
FIG. 2 illustrates the association between software objects and hardware kernels in a typical wireless communication system architecture in accordance with one embodiment of the invention.

The present invention provides a system and method for hosting a plurality of processes in a wireless communication system. Each process may, for example, represent an echo associated with a mobile. In another example, each process represents all the echoes associated with a particular mobile. In the present invention, a plurality of application specific instruction set processors (ASISPs) execute a subset of the functions necessary to support a process in accordance with a communication protocol. One or more schedulers, in accordance with a time-slicing algorithm, determine the processes assigned to each ASISP. Thus, each ASISP potentially provides support for more then one process. However, at any given instance in time, calculations for only one of these supported processes, the active process, are actually performed by the ASISP. State information for each of the processes supported by a particular ASISP is stored in a memory bank that corresponds to the ASISP. Therefore, when the scheduler generates a request to switch processes, the ASISP can efficiently switch processes. Referring to FIG. 2, in one embodiment of the present invention, a virtual machine interface (VMI) abstracts details of the underlying wireless communication system. This abstraction facilitates preparation of application programs to configure a base station or mobile without requiring knowledge about the configuration, control or management of the underlying hardware. The VMI gives a programmer the ability to adapt to various communication protocols by invoking specific VMI software objects or programs without the need to directly program the hardware of the underlying wireless communication system. The VMI provides a collection of specialized software objects that counterpart hardware functionality, or kernels, in the underlying wireless communication system. The VMI interface further provides a unique environment for optimizing the timing parameters and other constants used in the functions of a communication protocol. The VMI interface may further be used to facilitate the scheduling of basestation resources to effectively support large numbers of processes hosted by a cellular communication system.

FIG. 2 also illustrates the relationship between VMI software objects and counterpart hardware kernels within a wireless communication system, in accordance with one aspect of the present invention. VMI software objects are shown above line 248 and corresponding hardware objects are shown below line 248. The various VMI software objects as well as their hardware counterparts will now be briefly described. Further details on VMI objects and hardware kernels may be found in U.S. Pat. application No. 09/828,381.

Cellular Basestation Modem Engine Object 202. A cellular basestation modem engine (CBME) is a reconfigurable wireless network communication apparatus which itself is composed of a plurality of kernels to facilitate wireless communication. In one embodiment, a CBME is a Morphics cellular base transceiver system (BTS). CBME object 202 is a software object within the VMI that regulates various aspects of the underlying CBME hardware. In one embodiment, the hardware kernels below line 248 of FIG. 2 represent components of a cellular basestation modem engine such as the Morphics BTS.

Uplink 204. In CDMA, logical channels include the control and traffic channels. The traffic channels are used to carry user information, along with signaling traffic, between a basestation 105 and a mobile station 101 (FIG. 1). The control channels comprise downlink channels and uplink channels. Accordingly, the VMI provides an uplink object 204 and a downlink object (not shown). Uplink object 204 is used to group combiner objects 210 along with their respective attached finger objects 206 as well as searcher objects 208 that are common to a mobile uplink. Typically, combiner objects 210 and searcher objects 208 are added to an uplink object 204.

Finger object 206 and finger kernel 256. A finger kernel 256 is a component of a RAKE receiver. Each finger kernel of the RAKE receiver is used to track an individual multipath over time. The term echo is also used to refer to a multipath. Echoes are caused when the signal emitted from a transmitter "bounces" off an object and arrives at the receiver through an alternate, delayed path. In a typical environment, echoes are very dynamic in nature since a mobile 101 is moving relative to reflecting objects. A RAKE receiver is used to collect echoes, align them in time, and then accumulate the energy to produce the best possible signal strength. At any given point in time, each finger kernel 256 locks onto and tracks a particular echo and demodulates the data associated with the signal for later combining with other echoes. In addition to the fundamental demodulation of the incoming multipath, each finger kernel 256 is required to continually update an estimate of channel quality for the echo in order to test for a minimum level of quality across the channel. Further details on finger kernels 256 that are associated with the finger object class 417 of the present invention may be found in U.S. patent application No. 09/772,584. A finger object 206 is used to control the corresponding finger kernel 256. Finger objects 206 and their associated finger kernels 256, can be combined using combiner object 210.

Searcher object 208 and searcher kernel 258. In a spread spectrum system, basestations 105 as well as some handsets 101 transmit a standardized pilot signal having a known sequence of binary digits to aid in communication of data signals. These pilot signals can have a wide variety of codes, as determined by a specific communication protocol. For example, in one protocol a pilot signal has a length of $2^{15}$ (32,768) bits. This known sequence is referred to as a short pseudonoise (PN) sequence in IS-95 CDMA.

A searcher kernel 258 is designed to search for new echoes by correlating a received code sequence such as a short PN sequence having an unknown phase with a second code sequence that is a locally generated PN sequence with a known phase. Once a searcher kernel 258 finds an echo, a finger kernel 256 is assigned to the echo. Searcher kernels 258 in accordance with the present invention are disclosed in U.S. patent application Nos. 09/751,777, 09/751,785, and 09/751,783. A searcher object 208 provides a VMI software object for controlling a corresponding searcher kernel 258. In a typical embodiment, a searcher object 208 is associated with a searcher kernel 258 and thereby processes correlation results, performs peak detection, compares thresholds, and controls a multi-standard multi-dwell search engine.

Combiner object 210 and combiner kernel 260. A combiner kernel 260 combines the outputs of one or more finger kernels 256 and sums them in accordance with a combining rule. In some embodiments, a combiner kernel 260 is associated with one to sixteen finger kernels 256. In one embodiment of the present invention, each finger kernel 256 is assumed to track a single echo at any given point in time and a set of finger kernels 256 are set up for combination using VMI software objects.

After time alignment of each stream, the outputs of the set of finger kernels 256 are combined by arithmetically summing the outputs of each finger kernel 256. In non-coherent IS-95 mode, for example, a combination operation, such as a Hadamard Transform, results in arithmetic summation of the outputs before entry into a soft decision device. In coherent-mode, each finger kernel 256 provides an estimate of instantaneous channel energy and each is selected for combining based on a sufficiently large SIR.

Matched filter object 212 and matched filter kernel 262. Matched filter object 212 is used to control the corresponding matched filter kernel 262. Matched filter kernel 262 is a faster version of a searcher kernel 258, but the matched filter kernel 262 is not as configurable as the searcher kernel 258. In one embodiment of the invention, the matched filter 262 is used when the underlying wireless communication system is configured for 3GPP mode. In another embodiment of the present invention, a matched filter kernel 262 may be used in either a multi-standard CDMA traffic channel receiver or a RACH-type receiver (3GPP) and both coherent and noncoherent accumulation modes are allowed.

Code generation unit object (CGU) 214 and CGU kernel 264. CGU objects 214 are used to allocate CGU kernels 264. CGU kernels 264 are object-specific in that each CGU kernel 264 only works with one type of VMI object. In one embodiment of the present invention, a particular CGU kernel 264 only works with an uplink object 204, searcher object 208 or a downlink object (not shown). Illustrative CGU kernels 264 in accordance with various embodiments of the present invention are disclosed in U.S. patent application Nos. 09/751,782, 09/751,776, 60/222,829, and 09/772,584.

In some embodiments of the present invention, CGU unit kernel 264 provides all required codes among a set of standards, including but not limited to IS-95, cdma2000, IS2000, ARIB, and 3GPP. Various codes are generated for both uplink and downlink requirements. In some embodiments of the present invention, CGU kernels 264 contain timing information for a modem and for each individual finger kernel 256 of a RAKE receiver. In additional embodiments of the present invention, CGU kernels 264 contain a mask generation unit, which is used to transform a given code offset into a set of code dependent parameters. Such parameters are used in the reassignment of the phase of a code. The output of a CGU kernel 264 is a pseudo-random noise code sequence for the downlink and each RAKE finger.

As FIG. 2 illustrates, there is a hierarchical relationship among VMI objects in one embodiment of the present invention. On the hardware side, hardware kernels, 256, 258, 260, 262 and 264 are coupled to each other via a reconfigurable interconnect 266. As FIG. 2 further illustrates, there is at least one hardware kernel for each instantiated object in the VMI in some embodiments of the present invention. For example, CGU object 214, combiner object 210, and matched filter object 212 are each supported by hardware counterparts: CGU kernel 264, combiner kernel 260 and matched filter kernel 262. However, it is also possible for one hardware kernel to support a plurality of VMI objects. Such single-kernel-to-multiple-object correspondence is possible if searcher objects 208-1 and 208-2 can be serviced by a single searcher kernel 258 in a time-sliced fashion.

The VMI objects illustrated in FIG. 2 are designed to synchronize the corresponding hardware kernels so that a manipulation of the VMI objects causes an analogous change in the hardware components. For example, if the user changes a parameter in a searcher object 208, for instance the sub-chip resolution value of the searcher object 208, that change will be reflected in the corresponding hardware (i.e. search kernel 258) within the appropriate time interval.

FIG. 2 illustrates VMI objects and kernels representing a defined number of searchers, fingers, combiners, code generation units, and matched filters. However, it will be appreciated by one of skill in the art that any number of hardware kernels and corresponding software objects may be created and utilized in accordance with the needs and requirements of a particular communication system within the physical limits of available resources. Various VMI objects can be instantiated, parameterized and reconfigured to accommodate and adapt to the unique requirements of various communication protocols. For example, when a CDMA protocol is used, a MPSK (multiple phase shift keying) demodulator object, a convolutional decoder object, and a rake receiver object are instantiated and parameterized to configure the corresponding hardware modules. On the other hand, when a TDMA protocol is used, a MPSK demodulator object, a convolutional decoder object, and an MLSE equalization object are instantiated and parameterized according to TDMA protocol specifications.

Figure 3:
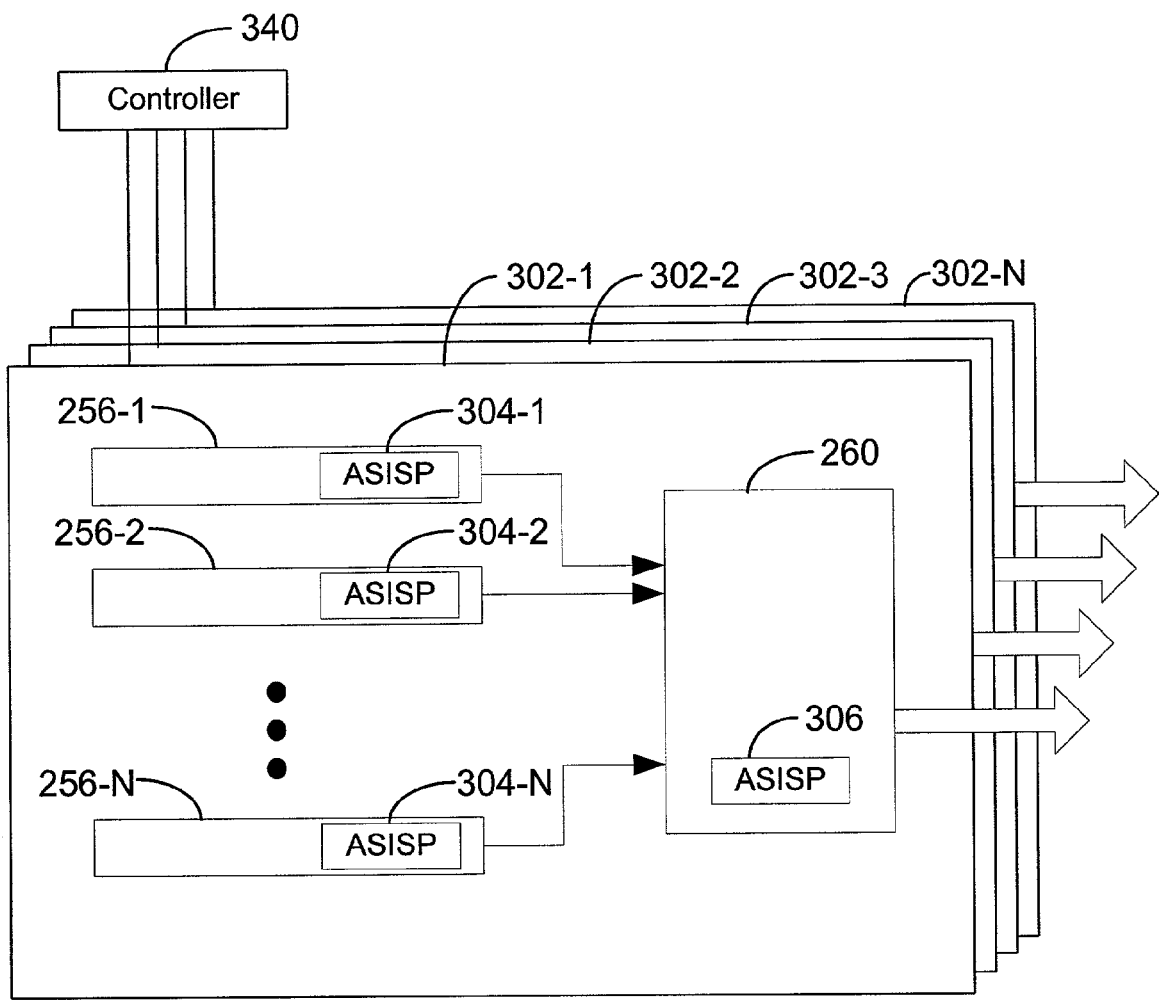
FIG. 3 illustrates the relationship between various application specific instruction set processors (ASISPs) in a typical wireless communication system architecture in accordance with one embodiment of the invention.

FIG. 3 illustrates a portion of the architecture of a wireless communication system in accordance with one embodiment of the invention. In particular, FIG. 3 illustrates a portion of a basestation that is partitioned into hardware planes 302. On each hardware plane 302, the output of a set of finger kernels 256 is combined by a combiner kernel 260. Each finger kernel 256 includes a finger ASISP 304 and each combiner kernel 260 includes a combiner ASISP 306.

Hardware planes 302 are allocated to various processes hosted by a wireless communication system using scheduler 340. In one embodiment of the present invention, scheduler 340 comprises VMI code. In another embodiment of the present invention, scheduler 340 is implemented as logic on a microchip. In yet another embodiment of the present invention, scheduler 340 is some combination of programmable logic and hardware logic embedded in a microchip. Those of skill in the art will appreciate that there are any number of additional ways in which scheduler 340 may be implemented and all such implementations are within the scope of the present invention.

In one embodiment of the present invention, scheduler 340 allocates a particular hardware plane 302 for a time-slice to a specific process supported by the wireless communication system. As an example, at time-slice number 1, hardware plane 302 is allocated to process A, where process A is a first mobile (cellular phone call) hosted by the wireless communication system. While hardware plane 302-1 is allocated to process A, each echo associated with process A is tracked by one of finger kernels 256 and all the echoes are combined by combiner kernel 260. Then, at time-slice number 2, hardware plane 302-1 is reallocated to process B, where process B is a second mobile hosted by the wireless communication system. When hardware plane 302 is reallocated to process B, process A becomes inactivated. The process is still supported by the wireless communication system. However, parameters associated with the process are not refined or updated while the process is inactivated. These parameters, also know as state information, are stored in a unique memory structure associated with each combiner ASISP 306. At a subsequent time-slice, hardware plane 302-1 may be reassigned to process A. When this occurs, state information associated with process A is retrieved from memory and functions, such as the estimate of the phase and timing drift of each echo associated with process A, are computed throughout the time-slice.

It will be appreciated by those of skill in the art that the hardware planes in FIG. 3 are for illustrative purposes only. In fact, in some embodiments of the present invention, scheduler 340 determines which finger kernels 256 are allocated to a particular combiner kernel 260 and the allocation of particular finger kernels 256 to a given controller kernel 260 is not restricted by hardware planes 302. Thus, in some embodiments of the present invention, any number of finger kernels 256, from any hardware plane 302, may be associated with a particular combiner kernel 260.

In some embodiments of the present invention, the energy output level of a particular finger kernel 256 is used to dynamically determine whether the kernel should remain allocated to a particular combiner kernel 260. As an example of this dynamic allocation, consider a finger kernel 256 that is estimating phase shift and/or timing drift for an echo associated with a first mobile. The results of these calculations are provided to a first combiner kernel 260. At some point, the energy estimated by finger kernel 256 for the echo falls below a predetermined threshold value. When this occurs, scheduler 340 reassigns the finger kernel 256 to a new echo. If the new echo is in fact associated with a different mobile, the scheduler must reassign the finger kernel 256 to the combiner 260 associated with the different mobile.

In one embodiment of the present invention, exemplary finger ASISP 304 implements two types of functions of a communication protocol: channel estimation (CE) and timing estimation. Channel estimation provides estimates of the phases of an incoming echo. Timing estimation uses a delay lock loop (DLL) mechanism to estimate the timing drift of the incoming echo.

Exemplary combiner ASISP 306 executes three functions associated with a communication protocol: frequency error estimation, finger energy estimation, and signal-to-interference (SIR) estimation. The frequency error estimation function estimates the frequency drift of an incoming signal and tracks the frequency error using a frequency locked loop (FLL). The energy estimation function estimates energy in the finger kernels 256. The results of the energy estimation can be used to determine whether a finger kernel 256 has a strong enough signal to contribute to combiner kernel 260. This energy information can also be passed back to scheduler 340 for finger reassignment algorithms performed by scheduler 340. The SIR estimation is used to assist generation of power control bits. A unique feature of the combiner kernel 260 is that it runs in a time-sliced fashion. Therefore, all required inputs to combiner kernel 260 are made available to the combiner at the beginning of each time-slice.

Figure 4:
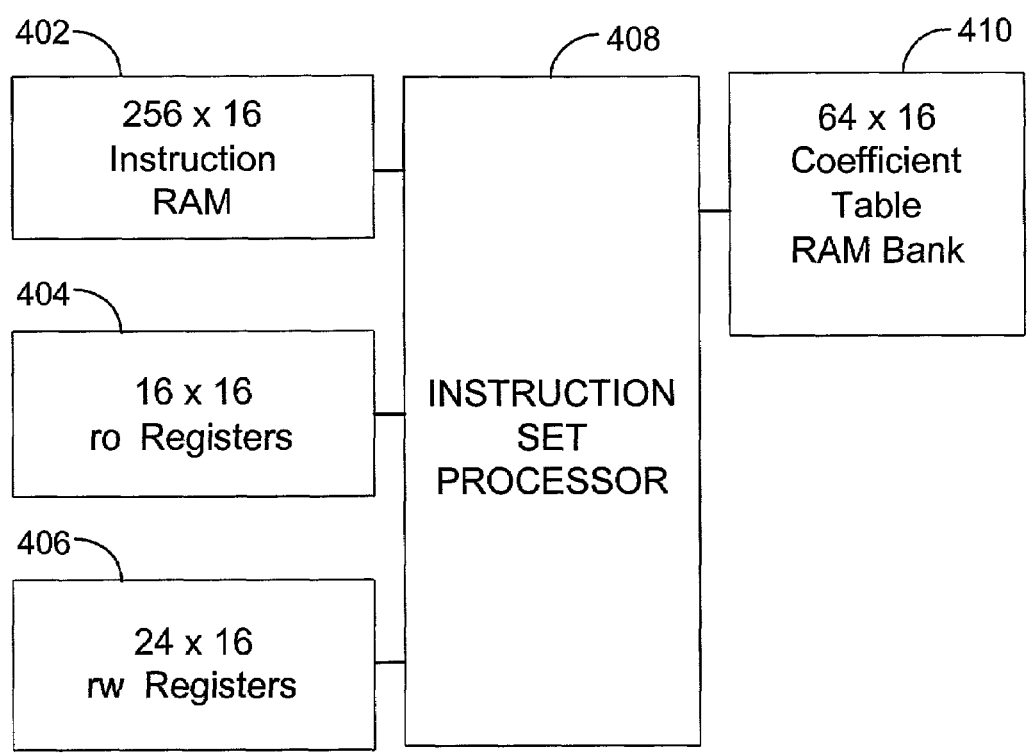
FIG. 4 illustrates an exemplary architecture of a finger ASISP.

FIG. 4 illustrates an exemplary finger ASISP 304 architecture in accordance with the present invention. Exemplary finger ASISP 304 includes a 256×16 bit instruction random access memory (RAM) 402 that is used to store programs and data associated with channel estimation and/or timing estimation algorithms. All instructions processed by finger ASISP 304 are received through input register 404, which is a 16×16 bit register in the illustrated embodiment (FIG. 4). Calculations are performed by exemplary finger ASISP 304 and all output from the ASISP is placed on output register 406. In the illustrative embodiment shown in FIG. 4, output register 406 is a 24×16 bit register. Exemplary finger ASISP 304 further includes an instruction set processor (ISP) 408 that is capable of executing a limited set of instructions. For example, ISP 408 is capable of executing channel estimation and timing estimation instructions that are loaded into input register 404. Because the types of instructions that may be performed by ASISP 304 are limited, the complexity of components 402-410 is advantageously simple. Therefore, ASISPs of the present invention have a high degree of energy efficiency.

Finger ASISP 304 further includes RAM bank 410 for storing constants that are used when performing channel estimation and timing estimation. These constants are initialized in RAM bank 410 prior to runtime operation of an instruction.

In one embodiment of the pesent invention, the total size of RAM bank 410 is 64 16-bit words and it has the layout provided in Table 1.

TABLE 1

RAM bank 410 layout

| Address | Usage |
|---|---|
| 0 | alpha 1 (DLL) |
| 1 | alpha 2 (DLL) |
| 2 | Number of symbols to integrate (DLL) |
| 3 | Threshold 1 (DLL) |
| 4 | Threshold 2 (DLL) |
| 5 | Threshold 3 (DLL) |
| 6 | FIR a1 (CE) |
| 7 | FIR a2 (CE) |
| 8 | FIR a3 (CE) |
| 9 | FIR a4 (CE) |
| 10 | FIR a5 (CE) |
| 11 | FIR a6 (CE) |

In Table 1, the constants 0 through 5 are used in a communication protocol timing estimation and constants 6 through 11 are used in a communication protocol channel estimation (CE) function.

DLL function. The DLL function takes I/Q inputs for early, on-time, and late symbols representing an echo and produces an estimate of the absolute phase of the echo. It will be appreciated that echoes hosted by a wireless communication system are typically over-sampled at some predetermined over-sampling rate (e.g., 4x or 8x over-sampling rate). Generally this data is represented by pairs of values, where each pair of values includes an "In-Phase"(I) value and a "Quadrature"(Q) value.

In one embodiment, a finger kernel 256 is supplied with three samples, where each sample includes the pair of values (i.e., I and Q data) per clock period (or chip). The samples can be referred to as Early, On-Time, and Late. The On-Time sample contains the data to be decoded. The Early and Late samples are used as tracking tools to ensure that the On-Time sample represents the center of the chip. The first step in the DLL function is used to compute magnitudes for the Early, On-time and Late inputs (Equations 1.1-1.3).

$$\text{early} = (\text{early}\_I^2 + \text{early}\_Q^2) \quad (1.1)$$

$$\text{ontime} = (\text{ontime}\_I^2 + \text{ontime}\_Q^2) \quad (1.2)$$

$$\text{late} = (\text{late}\_I^2 + \text{late}\_Q^2) \quad (1.3)$$

These magnitudes are then used to compute accumulated On-time and Error values (Equations 1.4-1.5).

$$\alpha_2 \cdot acc\_\text{ontime}[n-1] \quad (1.4)$$

$$\text{error}[n] = \alpha_1 \cdot (\text{early-late}) + \alpha_2 \cdot \text{error}[n-1] \quad (1.5)$$

The coefficients $\alpha_1$ and $\alpha_2$ are loaded from RAM bank 410 at offsets 0 and 1 (FIG. 4). The number of symbols n to accumulate is also loaded via RAM bank 410 at offset 2. Each symbol includes a predetermined number of chips. Thus, the number n, which is stored in offset 2 of RAM bank 410 in this example, indicates how many pairs of values (i.e., I and Q data) should be accumulated. When the specified number of symbols has been accumulated, the DLL algorithm computes a phase offset correction in $\frac{1}{8}^{th}$ chip units for the echo. The magnitude of the correction is determined by comparing the accumulated error to the accumulated On-time, scaled by a set of thresholds. Thresholds are loaded from RAM bank 410, at offsets 3-5. The algorithm proceeds as follows:

If ($acc\_$ontime=0) then phase_offset=0 else if ($abs$(error)<$acc\_$ontime·threshold$_1$) then phase_offset=0 else if ($abs$(error)<$acc\_$ontime·threshold$_2$)

then phase_offset=1 else if ($abs$(error)<$acc\_$ontime·threshold$_3$) then phase_offset=2 else phase_offset=4

The correct sign of the phase offset is then restored:

$$\text{sign}(\text{phase}\_{offset}) = -\text{sign}(error)$$

The last step in the DLL is to compute the absolute phase of an echo hosted by the finger kernel 256 by adding the computed phase offset to the previous absolute phase. The absolute phase estimate is stored to register 406 as the output of the DLL.

abs_phase=abs_phase+phase_offset

Prior to completion, the On-time and error accumulations stored in RAM bank 410 are reset to zero, and the state count is restored to the number of symbols to accumulate.

Channel Estimation function. ASISP 304 is responsible for computing a channel estimate (CE) for finger kernel 256. In one embodiment, two pilot signals, I and Q, are summed over a time-slice. The exact number of symbols that are summed during the time-slice depends on the pilot symbol format used. In one embodiment of the present invention, offset 12 of register 406 is used to indicate whether a particular input symbol is a pilot symbol. If the communication protocol is 3GPP and offset 12 of register 406 has a value of 0×1, the input symbol is added to the first pilot signal summation. If offset 12 of register 406 is 0×3, the input symbol is added to the second pilot signal summation. On the last symbol of a particular time-slot, the first pilot signal is provided to a first 6-tap FIR filter, and the second pilot signal is provided to a second 6-tap FIR filter. In one embodiment of the present invention, the outputs of the FIR filters are respectively stored at offsets 4 and 5 of register 406 and represent "I" and "Q" Channel Estimates. In addition, coefficients for the FIR filters are stored in RAM bank 410 at offsets 6-11.

Figure 5:
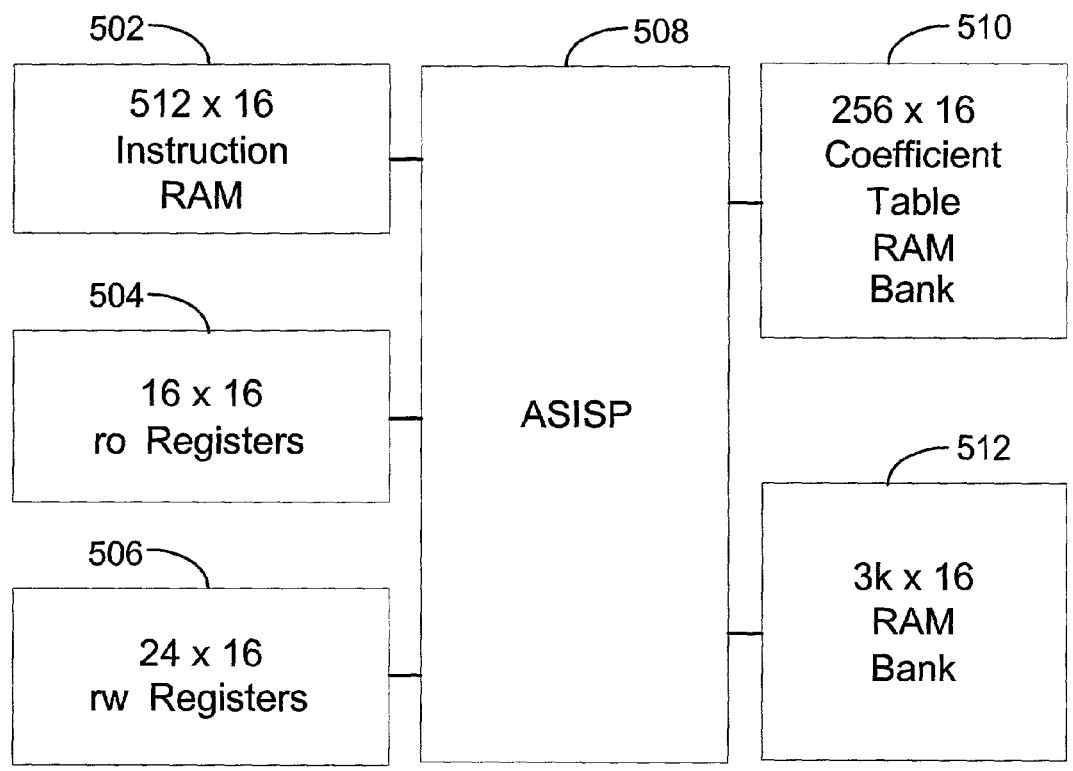
FIG. 5 illustrates an exemplary architecture of a combiner ASISP.

FIG. 5 illustrates an exemplary combiner ASISP 306 architecture. The exemplary ASISP 306 includes a 512×16 bit instruction random access memory (RAM) 502 that is used to store programs and data associated with frequency error estimation, finger energy estimation, and signal-to-interference (SIR) estimation functions. Instructions processed by combiner ASISP 306 are received through input register 504, which in the illustrated embodiment is a 16×16 bit register. Calculations are performed by exemplary combiner ASISP 306 and all output from the ASISP is provided to output register 506. In the illustrative embodiment shown in FIG. 5, output register 506 is a 24×16 bit register. Exemplary combiner ASISP 306 further includes an instruction set processor (ISP) 508 that is capable of executing a limited set of instructions. For example, ISP 508 is capable of executing frequency error estimation, finger energy estimation, and signal-to-interference (SIR) instructions that are loaded into input register 504.

Combiner ASISP 306 further includes RAM bank 510 to store various constants associated with the functions computed by the ASISP. In addition to the storage of constants, a portion of RAM bank 510 is used to store a finger kernel identifier after the identifier has been obtained from input register 504. The finger kernel identifier is then available for subsequent processing. In one embodiment, combiner ASISP 306 expects the contents of RAM bank 510 to be set up prior to calling the ASISP. This may be accomplished using VMI commands. In an exemplary embodiment of the present invention, the communication protocol used by the wireless communication system is 3GPP wideband CDMA and the total size of RAM bank 510 is 256 16-bit words.

Figure 6:
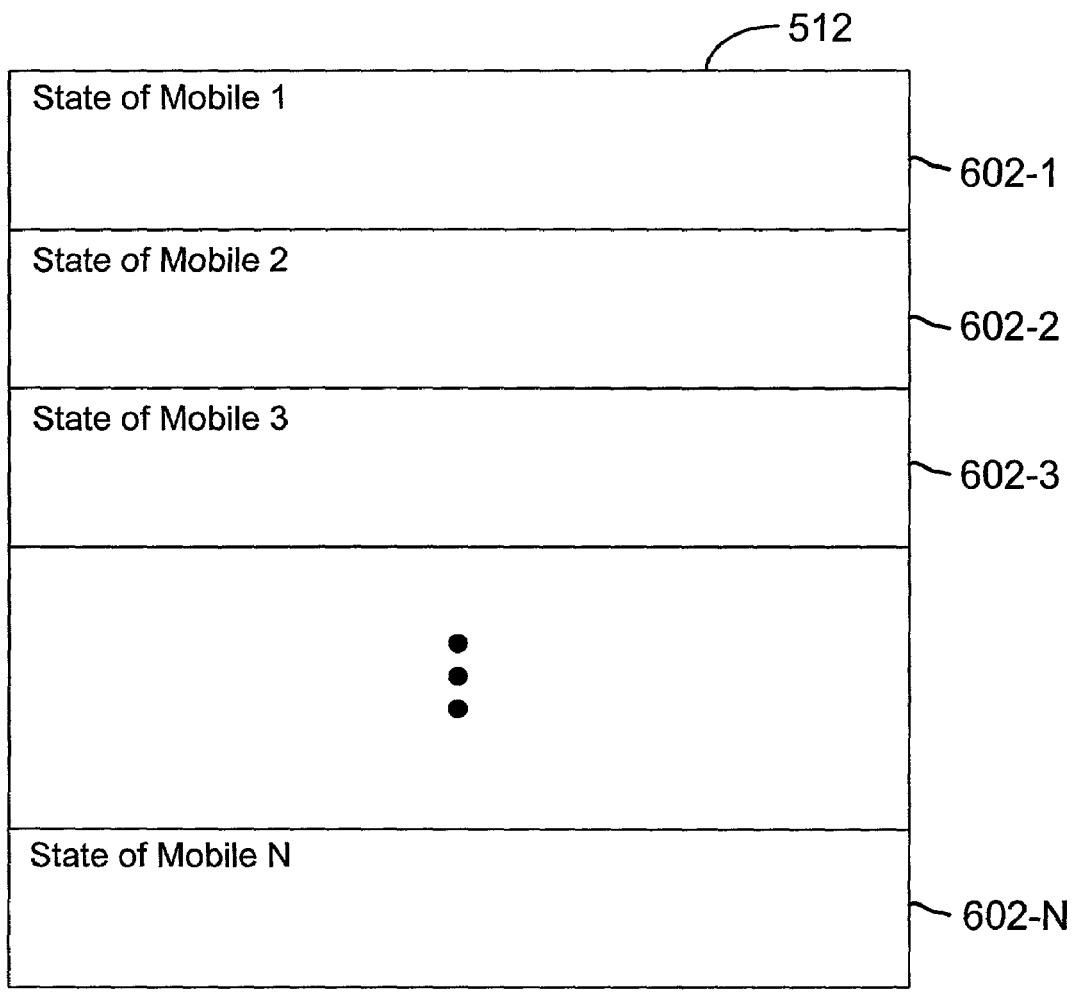
FIG. 6 illustrates the data structure of a combiner ASISP RAM Bank 512 in accordance with one embodiment of the present invention.

Combiner ASISP 306 further includes a RAM bank 512 to store mobile data blocks. Each mobile that is supported by combiner kernel 260 (FIG. 3) is assigned a block in RAM bank 512. FIG. 6 illustrates an exemplary RAM bank 512 in accordance with one embodiment of the present invention. Each mobile assigned to a combiner kernel 260 is allocated a block 602 in RAM bank 512. In one embodiment of the present invention, each block 602 consists of 128 16-bit words of data and the total size of RAM bank 512 is 3072 16-bit words. Various parameters required to process a mobile are stored in block 602 so that they can be restored the next time processing of the mobile is required. That is, mobile state information for mobile N is stored in block 602-N until the state information is needed by combiner 260 to actively support the mobile. The inclusion of memory bank 512 in ASISP 306 provides several advantages. An ASISP 306 can be switched from actively supporting one process to actively supporting a different process using memory bank 512. When a controller instructs combiner 260 to switch processes, the state information for the inactivated process is stored in a unique location in RAM bank 512. Then, the state information for the newly activated process is retrieved from RAM bank 512. Thus, a process switch is efficiently performed without wasting several chip cycles. Table 2 provides the state information that is stored in blocks 602 for each process supported by an ASISP 306 in accordance with one embodiment of the present invention.

TABLE 2

Mobile state information stored in block 602

| Offset | Usage |
| --- | --- |
| 0 | Combiner mask |
| 1 | Z[n] = integrated frequency error |
| 2 | Reserved |
| 3 | NFLL - number of pilots to sum for FLL |
| 4 | X[n] = running freq error sum |
| 5 | Y[n] = filtered freq error |
| 6 | lock mask |
| 7 | Reserved |
| 8 | Reserved |
| 9 | Reserved |
| 10 | SIR |
| 11 | SIR target |
| 12 | Downlink TPC history (3 bits) |
| 13 | soft combined I |
| 14 | soft combined Q |
| 15 | Reserved |
| 16-31 | xsum = finger energy buffer |
| 32-47 | ysum_comb = comb filtered finger energy |
| 48-63 | ysum_lock = lock filtered finger energy |
| 64-79 | finger energy estimate |
| 80-127 | Unused |

Select entries in Table 2 will now be described for one illustrative embodiment of the present invention.

Offset 0. The combiner mask contains a set of 16 bits, one for each possible finger kernel 256 assigned to combiner 260. A bit value of 1 indicates the finger kernel 256 is active, and a bit value of 0 indicates the finger kernel 256 is inactive.

Offset 1. One of the primary tasks of combiner 260 is to take as input the frequency error estimates (FED) from each finger kernel 256 and produce a rotator angle at the end of each time-slice. Z(n) represents the integrated frequency error at the end of the last time-slice.

Offset 3. NFLL represents the number of pilot signals that are fed to combiner kernel 260 by finger kernels 256.

Offset 4. X[N] is a running sum of the frequency error discriminator (fed) inputs from each active finger kernel 256.

Offset 5. Y[n] represents the filtered frequency error at the end of the last time-slice processed by combiner ASISP 306.

Offset 6. The lock mask includes a bit for each finger kernel 256 associated with a combiner kernel 260. At the end of each time-slice, the long-term energy estimate of each finger kernel 256 is compared to a predetermined threshold value. If the long-term energy estimate exceeds the threshold, the bit corresponding to the finger kernel 256 in the lock mask is set to 1. The lock mask is used by other hardware components within the wireless communication system to support the process.

Offset 10. SIR is a measure of the signal-to-interference for the mobile after the last time-slice.

Offset 11. SIR target is a predetermined threshold value that describes the target value for the SIR.

Offset 12. TPC bits generate power change requests that are received from mobiles. A TPC bit value of one indicates a request by the mobile to increase the downlink power. Likewise, a TPC bit of value zero indicates a request by the mobile to decrease the downlink power. Downlink TPC history represents a history of the TPC bit over a series of time-slices.

Offset 13. The soft combined I is the summation of the "I" channel estimates from each of the finger kernels 256 associated with a combiner kernel 260.

Offset 14. The soft combined "Q" is the summation of the Q channel estimates from each of the finger kernels 256 associated with a combiner kernel 260.

Offsets 16-31. Each time-slice has several symbols. For each of the first nine symbols of a slice, the energy of each input finger kernel 256 is summed in this exemplary embodiment. These finger energy sums ($xsum_i$) are normalized for the number of symbols summed (i.e. by $\frac{1}{9}$) and stored at offsets 16-31.

Offsets 32-47. Finger energy sums ($xsum_i$) are filtered to produce the finger energy estimates "$ysum\_comb_i$" and "$ysum\_lock_i$". The first estimate, $ysum\_comb_i$ is made by filtering over a small number of slots, typically 3, and is used to update the combiner mask. The purpose of this estimate is to exclude finger kernels 256 from the combining process that undergo short-term temporary fading.

Offsets 48-63. The energy estimate, $ysum\_lock_i$, is filtered over a larger number of slots, typically 6, and is used to update the lock mask. The purpose of this estimate is to provide feedback to the scheduler on finger kernels 256 that should be discarded from the combining set. The estimates are filtered using an alpha filter and alpha filter coefficients are loaded from RAM bank 510 (FIG. 5).

Offset 64-79. After the combiner mask update is complete, the short-term finger energy estimates ($ysum\_comb_i$) are reset to zero to prepare for the next estimation process. Prior to being reset however, the finger energy estimates are stored in offsets 64-79.

Those of skill in the art will appreciate that the process state information provided in Table 2 is merely exemplary. The present invention may be used to store any type of information about an inactivated process that may be useful upon reactivation of the process. The architecture of two exemplary ASISPs, finger ASISP 304 and combiner ASISP 306, have now been described. The ASISPs of the present invention are advantageous because they can be used in accordance with a time-sliced algorithm to support multiple processes, such as mobiles. In particular, a combiner ASISP can efficiently switch from executing functions, such as frequency error estimation, for a first mobile to executing functions for a second mobile. This improved efficiency is derived, in part, by storing the state information for each process supported by the ASISP in local memory. The improved efficiency is also derived by limiting the types of functions that a particular ASISP can execute.

Exemplary embodiments have been disclosed in which finger kernel 256 is supported by an application specific ISP. This application specific ISP is only capable of executing functions that directly support finger kernel 256, such as a delay lock loop or channel estimation functions. Further, a combiner kernel 306 that is supported by a another form of application specific ISP, combiner ASISP 306, has been disclosed. In one embodiment, combiner ASISP 306 is only capable of executing functions that directly support combiner kernel 260, such as frequency error estimation, finger energy estimation and/or signal-to-interference estimation.

Figure 7:
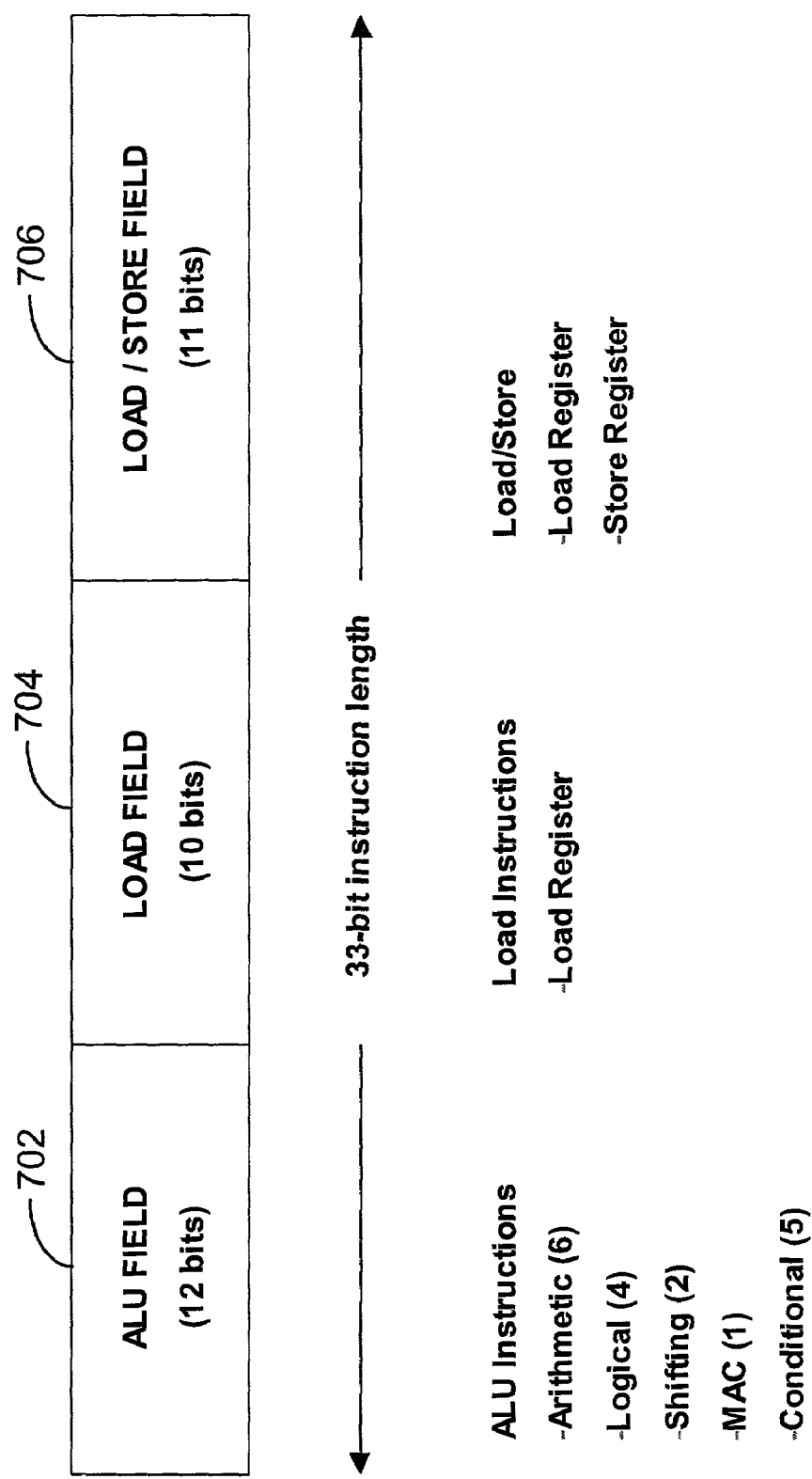
FIG. 7 illustrates the format of an exemplary instruction set that is used to program an ASISP in accordance with one embodiment of the present invention.

Some ASISPs of the present invention support a novel form of instruction set that facilitates improved performance and energy efficiency. One such instruction set is illustrated in FIG. 7. In one embodiment of the present invention, the same instruction set is used by both finger ASISPs 304 and combiner ASISPs 306 even though these ASISPs are used to compute different types of functions. All instructions in the exemplary instruction set of FIG. 7 have a 33-bit wide instruction word. It will be appreciated instruction lengths other then 33 may be used. For example, some performance gain could be realized by limiting the instruction word length to 32 bits. However, it is likely that the ever-increasing complexity of communication protocols could necessitate the use of instructions that have a word length that is much greater then 32 bits.

Most instructions in the exemplary instruction set of FIG. 7 have three operations embedded into each instruction: an arithmetic logic unit (ALU) operation 702, a load operation 704 and either a load or store operation 706.

In one embodiment of the present invention, ALU field 702 includes operations such as NOP, ADD, SUBTRACT, NEGATION, ROUND, AND, OR, XOR, NOT, LEFT BARREL SHIFT, RIGHT BARREL SHIFT, MULTIPLY, MAC (e.g. d0+=x0 * y1), GREATER THAN ZERO, EQUAL TO ZERO, LESS THAN ZERO, GREATER THAN OR EQUAL TO ZERO, and LESS THAN OR EQUAL TO ZERO. Thus, operations in field 702 may be classified as arithmetic, logical, shifting, MAC, or conditional. Load field 704 and load/store field 706 encode instructions such as LOAD REGISTER and STORE REGISTER.

The exemplary instruction set illustrated in FIG. 7 further includes special instructions that provide additional control over the ASISPs of the present invention. These special instructions include WAIT, BRANCH, GOTO, LOOP INITIALIZE, and LOOP END. These special instructions are used by specialized input programs that provide an improved level of control over the ASISPs of the present invention. For example, when an ASISP executes a WAIT command in accordance with an input program, no further processing is performed by the ASISP for the rest of the time-slice. Therefore ASISP resources may be powered down during timeslices in which they are not needed. Other special instructions, such as BRANCH and GOTO, provide sufficient flexibility to program robust communication protocol functions like the finger energy estimation function of combiner ASISP 306.

Figure 8:
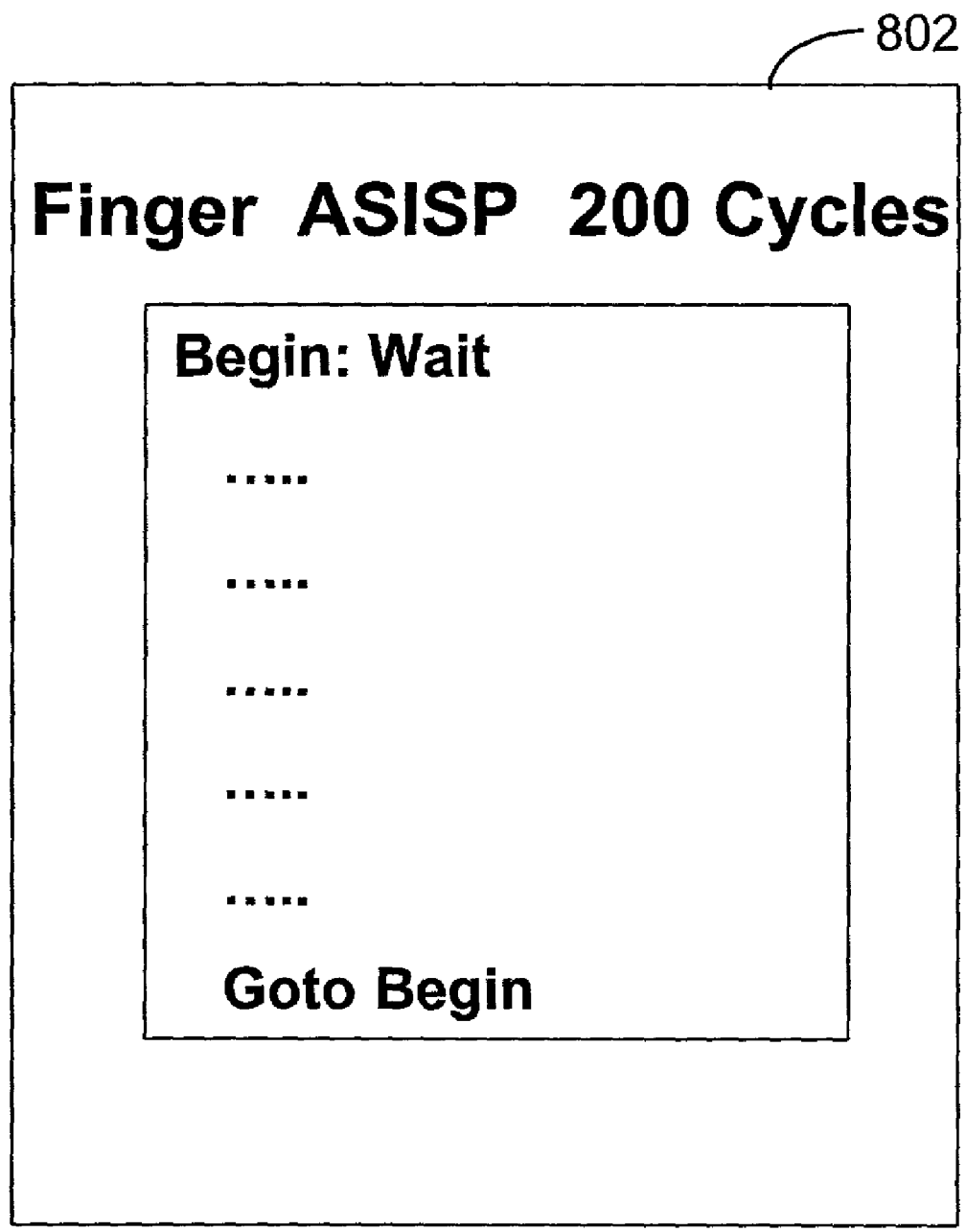
FIG. 8 illustrates the structure of an input program used to control a finger ASISP in accordance with one embodiment of the present invention.

FIG. 8 illustrates an input program 802 for exemplary finger ASISP 304. Each input program 802 implements communication protocol functions for a specific process hosted by the wireless communication system. Thus, for example, a first input program 802 may implement communication protocol functions for process A whereas a second input program may implement communication protocol functions for process B. However, in one embodiment, because ASISP 304 is operated in a time-sliced fashion, input program 802 is executed within a predetermined number of cycles or less under all conditions. As used herein, the term cycle refers to one processing cycle executed by an ASISP. For example, in one embodiment, input program 802 is completed within about 200 cycles under all conditions.

Figure 9:
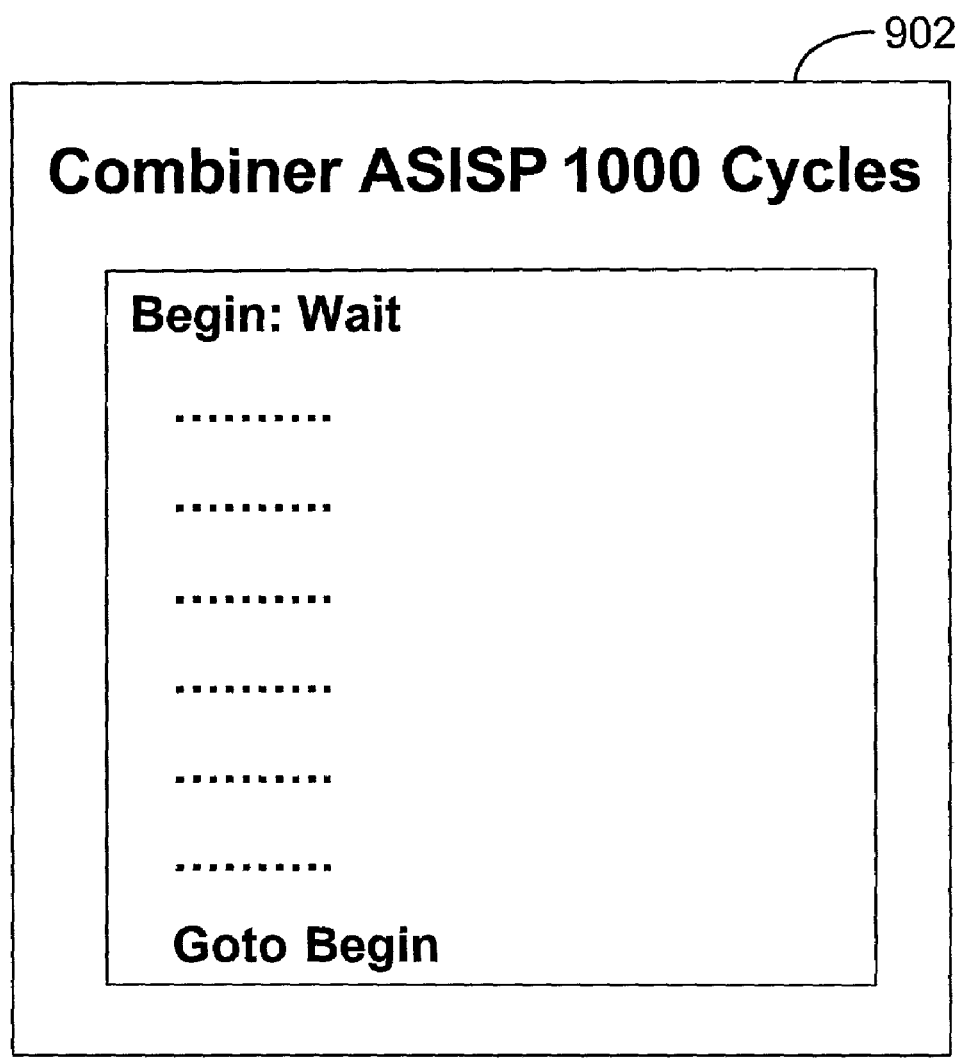
FIG. 9 illustrates the structure of an input program used to control a combiner ASISP in accordance with one embodiment of the present invention.

FIG. 9 illustrates an input program 902 for exemplary combiner ASISP 306. Input program 902 codes for one or more of the various communication protocol functions that are computed by ASISP 306. However, in one embodiment, because ASISP 306 is operated in a time-sliced fashion, input program 902 is executed within a predetermined number of cycles or less under all conditions. For example, in one embodiment, input program 902 is completed within about 1000 cycles.

The utility of many of the features of the present invention may be understood using an example in which combiner 306 is supporting processes A and process B, where process A is a first mobile and process B is a second mobile. At any given time, one of process A and process B is active and the other process is inactive. When a process is inactive, it is still supported by the wireless communication system. However, the tracking parameters of an inactive process are not refined while the process is inactive.

At time-slice zero of this example, scheduler 340 sends a request to hardware plane 302-N (FIG. 3) to make process A active. This is accomplished by sending input programs 802 (FIG. 8) to finger kernels 256 on the hardware plane 304 and an input program 902 (FIG. 9) to combiner kernel 260. Each input program 802 and/or 902 codes for cellular communication functions directed to tracking process A. During timeslice zero, hardware plane 302 tracks process A in accordance with input programs 802 and input program 902. Importantly, execution of input programs 802 and input program 902 is completed by ASISPs 304 and ASISP 306 during time-slice zero. At time-slice one, scheduler 340 sends a request to hardware plane 302-N to make process B the active process. Thus, process A becomes inactivated. The request by scheduler 340 is in the form of new input programs 802 and 904. New input programs 802 and 902 are directed to process B. In response to the request at the beginning of time-slice 1, combiner ASISP 306 stores the state information for process B in the section 602 of RAM bank 512 that is reserved for process B. Then, combiner ASISP 306 and designated finger ASISPs 304 begin execution of the new set of input programs. The method continues in the same manner in subsequent timeslices. Scheduler 340 determines the identity of the active process for each combiner kernel 260 and which finger kernels 256 will support the combiner kernel 260 using input programs 802 and 902. All references cited herein are incorporated herein by reference in their entirety and for all purposes to the same extent as if each individual publication or patent or patent application was specifically and individually indicated to be incorporated by reference in its entirety for all purposes.

The foregoing description, for purposes of explanation, used specific nomenclature to provide a thorough understanding of the invention. However, it will be apparent to one skilled in the art that the specific details are not required in order to practice the invention. In other instances, well-known components and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the following claims and their equivalents define the scope of the invention.

What is claimed is:

1. A wireless communication system for hosting a plurality of processes, each process in said plurality of processes executed in accordance with a communication protocol, the communication protocol including a set of functions, said wireless communication system comprising:
    a plurality of application specific instruction set processors (ASISPs), each ASISP capable of executing a subset of said set of functions included in said communication protocol; and
    a scheduler connected to said plurality of ASISPs for scheduling said plurality of ASISPs in accordance with a time-slicing algorithm so that each process in said plurality of processes is supported by said wireless communication system.

2. The wireless communication system of claim 1 wherein each said ASISP in said plurality of ASISPs further comprises:
    an input register for receiving an input program and state associated with a process in said plurality of processes, each instruction in said input program being part of a limited purpose instruction set that supports said subset of functions included in said communication protocol; and
    an output register for storing a value that indicates a state of said process after execution of said input program.

3. The wireless communication system of claim 2, wherein said input program is associated with a first process selected from said plurality of processes; and
    said time-slicing algorithm includes a step of allocating a selected ASISP in said plurality of ASISPs to said input program for a predetermined period of time.

4. The wireless communication system of claim 3, wherein said input program is not interrupted by said scheduler during said predetermined period of time.

5. The wireless communication system of claim 3 wherein execution of said input program is completed during said predetermined period of time.

6. The wireless communication system of claim 2, wherein said scheduler further includes a synchronization mechanism for synchronizing said plurality of ASISPs, the synchronization mechanism capable of reallocating an ASISP in said plurality of ASISPs from a first input program that is associated with a first process to a second input program that is associated with a second process.

7. The wireless communication system of claim 6 wherein said first process is a first echo and said second process is a second echo.

8. The wireless communication system of claim 6 wherein said first process is each echo associated with a first mobile and said second process is each echo associated with a second mobile.

9. The wireless communication system of claim 2, wherein said time-slicing algorithm defines a predetermined period of time;
    said limited purpose instruction set includes a "wait" instruction for synchronization; and
    each ASISP in said plurality of ASISPs is configured so that when said "wait" instruction is received by said input register, the ASISP does execute a communication protocol function during said predetermined period of time and then automatically returns to an idle state thereby reducing a power consumption of the ASISP during the predetermined period of time.

10. The wireless communication system of claim 2, further including a plurality of memory modules, each memory module in said plurality of memory modules associated with a different ASISP selected from said plurality of ASISPs.

11. The wireless communication system of claim 10 wherein said state of said process stored in said output register is stored in a unique segment of said different memory module, the unique segment of said memory module being determined by an identity of said process.

12. The wireless communication system of claim 11 wherein said output register is further used to store a process identifier value that provides said identity of said process.

13. The wireless communication system of claim 1 wherein said communication protocol is a code division multiple access (CDMA) protocol.

14. The wireless communication system of claim 13 wherein said communication protocol is selected from the group consisting of IS-95 CDMA, IS-95B CDMA, CDMA TIA IS2000, TIA IS 2000A, wideband CDMA (WCDMA), cdma2000, and ARIB WCDMA.

15. The wireless communication system of claim 1 wherein said communication protocol is a time division multiple access (TDMA) protocol.

16. The wireless communication system of claim 15 wherein said communication protocol is IS-136 TDMA.

17. The wireless communication system of claim 1 wherein said ASISP is a finger ASISP and said subset of functions comprises a delay lock loop (DLL) and a channel estimation.

18. The wireless communication system of claim 1 wherein said ASISP is a combiner ASISP and said subset of functions comprises a frequency error estimation, a finger energy estimation, and a signal-to-interference (SIR) estimation.

19. The wireless communication system of claim 1 wherein each process in said plurality of processes is an echo.

20. The wireless communication system of claim 1 wherein each process in said plurality of processes uniquely corresponds to a different mobile hosted by said wireless communication system and each said process combines a plurality of echoes associated with the corresponding different mobile.

21. The wireless communication system of claim 1 wherein each said ASISP in said plurality of ASISPs is capable of executing said subset of said set of functions on a time-scale of about 400 to about 5,000 times per second.

22. The wireless communication system of claim 1 wherein each said ASISP in said plurality of ASISPs further comprises:
an input register for receiving an input program associated with a process in said plurality of processes, each instruction in said input program being part of a limited purpose instruction set that supports said subset of functions included in said communication protocol; and
each instruction in said limited purposed instruction set includes an arithmetic logic unit field, a load field, and a load/store field.

23. A method for reducing an amount of inter-process overhead between computing components in a device capable of hosting a plurality of communication processes, each communication process in said plurality of communication processes operating in accordance with a communication protocol, comprising:
distributing a plurality of application specific instruction set processors (ASISPs), each ASISP capable of executing a subset of a set of functions in accordance with said communication protocol; and
providing a centralized controller for sending control commands to each said ASISP in said plurality of ASISPs; wherein
said centralized controller schedules the functions calculated by each said ASISP in said plurality of ASISPs in a master/slave relationship, thereby reducing said amount of inter-process overhead between said computing components in said device.

24. A method for hosting a communication process with a communication architecture in accordance with a communication protocol, comprising:
allocating a plurality of application specific instruction set processors (ASISPs) in said architecture to support said communication process, each ASISP in said plurality of ASISPs capable of executing a subset of a set of functions defined by said communication protocol; and
providing a centralized controller in said architecture for scheduling each said ASISP in said plurality of ASISPs in accordance with a time-slicing algorithm that allocates computational tasks to each ASISP is said plurality of ASISPs in a time-sliced manner.

25. The method of claim 24, wherein each said ASISP in said plurality of ASISPs is dimensioned and configured for receiving scheduling commands and process state information from said centralized controller, wherein said process state information describes a state of said communication process.

26. The method of claim 25, wherein each said ASISP in said plurality of ASISPs receives input from non-scheduling control blocks in said communication architecture in addition to said scheduling commands from said centralized controller.

27. The method of claim 24 wherein a first group of ASISPs in said plurality ASISPs are dimensioned and configured to perform finger calculations and a second group of ASISPs in said plurality of ASISPs are dimensioned and configured to perform combiner calculations.

28. The method of claim 27 wherein said subset of functions associated with each ASISP is said first group of ASISPs comprise a delay lock loop (DLL) and a channel estimation.

29. The method of claim 27 wherein said subset of functions associated with each ASISP in said second group of ASISPs comprise a frequency error estimation, a finger energy estimation, and a signal-to-interference (SIR) estimation.

30. A method for hosting a plurality of processes in a wireless communication system, each process in said plurality of processes executed in accordance with a communication protocol, the communication protocol including a set of functions, comprising:
distributing a plurality of application specific instruction set processors (ASISPs), each ASISP capable of executing a subset of said set of functions included in said communication protocol; and
providing a scheduler for scheduling said plurality of ASISPs in accordance with a time-slicing algorithm so that each process in said plurality of processes is supported by said wireless communication system.

31. The method of claim 30 wherein each said ASISP in said plurality of ASISPs is dimensioned and configured to provide:
an input register for receiving an input program and state associated with a process in said plurality of processes, each instruction in said input program being part of a limited purpose instruction set that supports said subset of functions included in said communication protocol; and
an output register for storing a value that indicates a state of said process after execution of said input program.

32. The method of claim 31, wherein
said input program is associated with a first process selected from said plurality of processes; and
said time-slicing algorithm includes a step of allocating a selected ASISP in said plurality of ASISPs to said input program for a predetermined period of time.

33. The method of claim 32 wherein execution of said input program is completed during said predetermined period of time.

34. The method of claim 31, wherein said scheduler further includes a synchronization mechanism for synchronizing said plurality of ASISPs, the synchronization mechanism capable of reallocating an ASISP in said plurality of ASISPs from a first input program that is associated with a first process to a second input program that is associated with a second process.

35. The method of claim 34 wherein said first process is a first echo and said second process is a second echo.

36. The method of claim 34 wherein said first process is each echo associated with a first mobile and said second process is each echo associated with a second mobile.

37. The method of claim 31, wherein
said time-slicing algorithm defines a predetermined period of time;
said limited purpose instruction set includes a "wait" instruction for synchronization; and
each ASISP in said plurality of ASISPs is configured so that when said "wait" instruction is received by said input register, the ASISP does execute a communication protocol function during said predetermined period of time and then automatically returns to an idle state thereby reducing a power consumption of the ASISP during the predetermined period of time.

38. The method of claim 31, further comprising distributing a plurality of memory modules, each memory module in said plurality of memory modules associated with a different ASISP selected from said plurality of ASISPs.

39. The wireless communication system of claim 38 wherein said state of said process stored in said output register is stored in a unique segment of said different memory module, the unique segment of said memory module being determined by an identity of said process.

40. The method of claim 39 wherein said output register is further used to store a process identifier value that provides said identity of said process.

41. The method of claim 30 wherein said communication protocol is a code division multiple access (CDMA) protocol.

42. The method of claim 41 wherein said communication protocol is selected from the group consisting of IS-95 CDMA, IS-95B CDMA, CDMA TIA IS2000, TIA IS 2000A, wideband CDMA (WCDMA), cdma2000, and ARIB WCDMA.

43. The method of claim 30 wherein each process in said plurality of processes is an echo.

44. The method of claim 30 wherein each process in said plurality of processes uniquely corresponds to a different mobile hosted by said wireless communication system and each said process combines a plurality of echoes associated with the corresponding different mobile.

45. The method of claim 30 wherein each said ASISP in said plurality of ASISPs is capable of executing said subset of said set of functions on a time-scale of about 400 to about 5,000 times per second.

46. The method of claim 30 wherein each said ASISP in said plurality of ASISPs further comprises:

an input register for receiving an input program associated with a process in said plurality of processes, each instruction in said input program being part of a limited purpose instruction set that supports said subset of functions included in said communication protocol; and each instruction in said limited purposed instruction set includes an arithmetic logic unit field, a load field, and a load/store field.

* * * * *

UNITED STATES PATENT AND TRADEMARK OFFICE
CERTIFICATE OF CORRECTION

| | | |
|---|---|---|
| PATENT NO. | : 7,606,576 B2 | Page 1 of 1 |
| APPLICATION NO. | : 09/912721 | |
| DATED | : October 20, 2009 | |
| INVENTOR(S) | : Chen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2339 days.

Signed and Sealed this

Twelfth Day of October, 2010

David J. Kappos
*Director of the United States Patent and Trademark Office*